Oct. 2, 1956 A. J. HAYWARD 2,765,176
SELF-CENTERING CHUCK
Filed Sept. 22, 1954
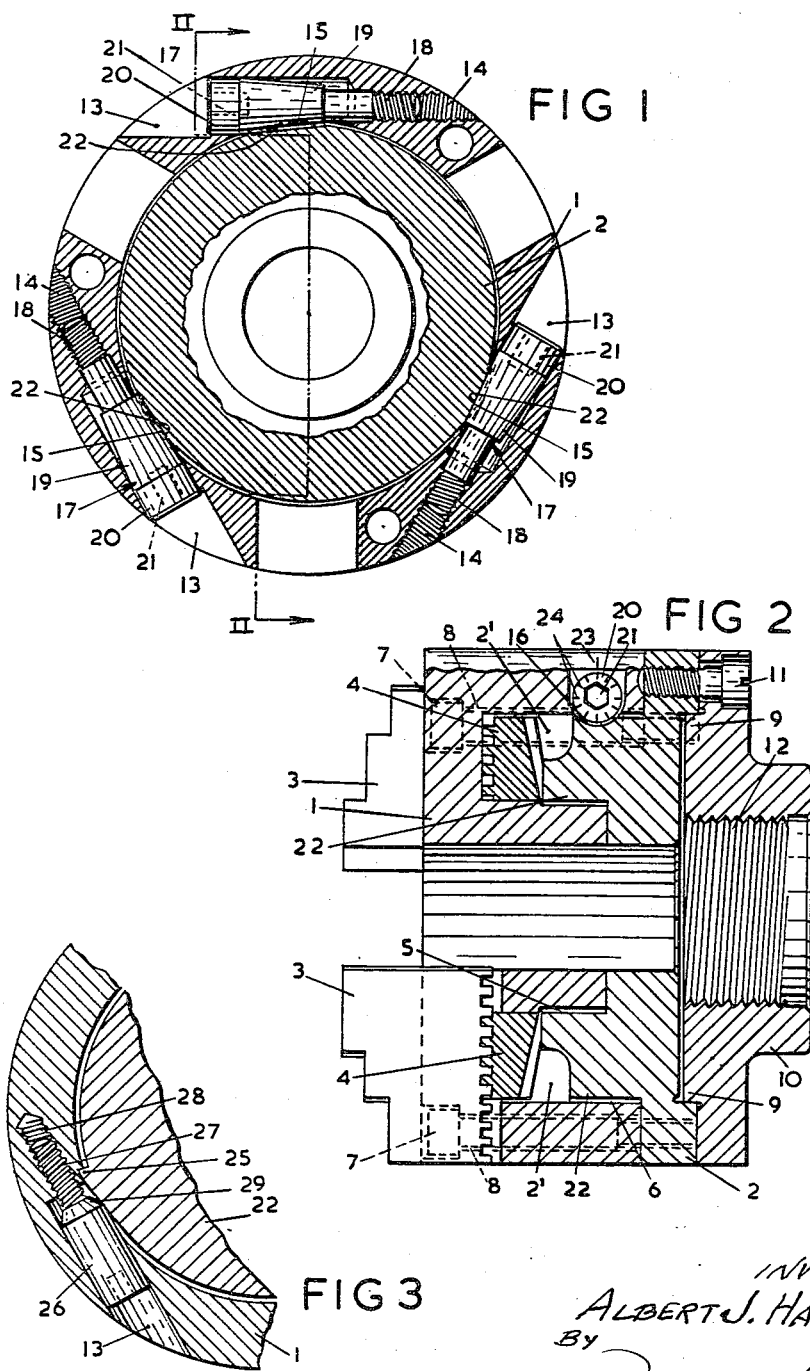
INVENTOR
ALBERT J. HAYWARD

United States Patent Office 2,765,176
Patented Oct. 2, 1956

2,765,176

SELF-CENTERING CHUCK

Albert John Hayward, London, England

Application September 22, 1954, Serial No. 457,638

Claims priority, application Great Britain
October 12, 1953

2 Claims. (Cl. 279—114)

The invention relates to chucks provided with so-called self-centering mechanism for operating the work holding devices, for instance, jaw chucks whether the mechanism for operating the work holding jaws is operated by hand or by power, e. g. by hydraulically or pneumatically operated devices.

The invention relates more particularly to chucks of the type which are composed of two main parts secured together so that they rotate together, one part which carries the work-holding devices being capable of adjustment relatively to the other in a plane transverse or normal to the axis of rotation for the purpose of effecting fine adjustment to compensate for inaccuracies in the centering mechanism and so ensure accurate setting of the work piece concentric with the axis of rotation.

Examples of jaw chucks of this type are described in French specification No. 447,590 and British specification No. 624,144, wherein the relative adjustment between the front and rear parts of the chuck in a plane normal to the axis of rotation is effected by grub screws carried by one part and adapted to engage with the other. The fineness of adjustment, however, is dependent on the fineness and accuracy of the screw threads which presents difficulties in manufacture.

An object of the invention is to enable extremely fine adjustments to be made between the two parts of the chuck by simple means, easy and economical to manufacture, such means not adding materially to the overall dimensions of the chuck.

According to the invention, a self-centering chuck having two main parts capable of relative adjustment normal to the axis of rotation is provided with tapering wedge members or cams carried by one part of the chuck and arranged to engage with the other part, the tapering wedge members or cams being adjustable so that by selective adjustment of them, the part which carries the work holding devices can be adjusted relatively to the other part within very fine limits, the profile of each wedge member determining the degree of adjustment which is not solely dependent on the accuracy or fineness of a screw.

The accompanying drawings illustrate applications of the invention to a self-centering jaw chuck, but, as mentioned above, the invention is not confined to such application.

In these drawings:

Figure 1 is a front sectional elevation with the jaws and jaw operating mechanism omitted;

Figure 2 is a side sectional elevation on line II—II, Figure 1, with the chuck jaws in position, and Figure 3 is a front sectional detail of a modification of the compensating mechanism.

The example of chuck illustrated by these drawings comprises two main parts, a front part 1 and a rear part 2.

The front part 1 carries the usual jaws 3 for gripping the workpiece, the jaws being self-centering, that is, they are movable radially and equally towards the axis of the chuck by the usual scroll mechanism indicated at 4, but so well-known in the art that description is unnecessary.

The two parts 1 and 2 are spigotted together; that is, the front part 1 is recessed in the rear at 2' to receive a spigot or boss 22 of the rear part 2, but slight clearance is allowed between them at 5 and 6, so that it is possible for the front part 1 to be moved relatively to the other in a plane normal to the axis of rotation.

The two parts 1 and 2 are secured together in known manner by cap-headed screws 7, slight clearance being left between the screws at 8.

The part 2 is shown recessed at its rear to receive a corresponding projection 9 on a back plate 10 to which it is secured by screws 11. The back plate or so-called adaptor plate 10 has a screw-threaded bore 12 to enable it to be screwed onto the machine spindle, but when it is desired to dispense with a back plate, the rear part 2 may be provided with a screw-threaded bore or other known means to enable it to be directly screwed onto the machine spindle nose. These are usual features with jaw chucks.

The front part 1 of the chuck is bored in several positions with tangential holes 13. Each hole 13 has an end portion 14 which is of small diameter and screw-threaded. The remainder of the hole is plain and of larger diameter and has a slot 15 in its inner side so that an adjacent portion of the spigot 22 of the rear part 2 is exposed at the slot. This exposed portion is formed with a semi-cylindrical groove 16.

An adjusting member 17 is inserted in each tangential hole 13. It comprises a screw-threaded stem 18 for engagement within the small screw-threaded part 14, a larger conical or tapering portion 19 for engagement within the adjacent groove 16 and a cylindrical part 20 which fits the outer end of the hole 13, this portion having a hole 21 of angular cross-section to receive a turn-key.

In use, assuming that a workpiece has been inserted in the chuck and has been centred by the usual scroll or spiral centering mechanism, the chuck is rotated and the workpiece is tested by the usual instrument for eccentricity. If it is eccentric the selected member or members 17 are rotated by a turn-key in either direction, as required, until the eccentricity of the workpiece has been corrected.

During the adjustment of any member 17, its tapering portion 19 bears on the adjacent grooved portion 16 of the spigot 22 of the rear part 2 of the chuck while the cylindrical part 20 of the member 17 bears on the surface of the corresponding hole 13 in the front part of the chuck, the screw-threaded stem 18 being supported in the screw-threaded part 14 of the hole 13. Consequently the member 17 is rigidly held in position. The taper of the part 19, which may, for example, be about 5° relatively to the axis of the member 17, determines the degree of relative displacement between the parts 1 and 2 of the chuck when a member 17 is moved axially by its screw-threaded stem.

An extremely fine adjustment is possible. Members 17 of different taper may be substituted one for the other to give varying degrees of adjustment.

One end of each adjusting member 17 may be graduated so that in conjunction with a datum mark 23 on the chuck, the degree of adjustment may be indicated. For example, as shown in Figure 2, the end of the cylindrical part 20 of each member 17 may be marked off with divisions 24. The taper of the member may be such that one complete rotation of the member will cause a movement or adjustment of the chuck and its workpiece of .005 inch. Hence, by noting the divisional markings 24 against the datum line 23 on the chuck during rotation of the member 17, the degree of adjustment can be ascertained or indicated.

In a modified example illustrated by Figure 3, the spigot 22 of the rear part 2 of the chuck is provided with inclined faces 25 against which abut cylindrical members 26 which have a reduced diameter portion which is screw-threaded at 27, the screw-threaded portion engaging in corresponding threads in tapped holes 28 in the front part 1 of the chuck. The ends of the members are slightly tapered at 29 to reduce wear between the members and the inclined faces. As in the previous example, rotation of the members 26 causes relative movement between the front and rear parts of the chuck.

In the examples given, it is preferable that the members should be tangential to the rear part 2 of the chuck, but any convenient angle between the members and the surface against which they bear may be adopted.

I claim:

1. A self centering chuck comprising a front part carrying work holding devices, a rear part provided with means for attaching the chuck on a machine spindle, means securing the two parts together and permitting relative transverse movement therebetween, one of said parts having a portion surrounding a portion of the other of said parts, said surrounding portion having a plurality of circumferentially spaced bores disposed transversely therein and tangentially intersecting and opening through the inner periphery of said surrounding portion, said bores having threaded portions of smaller diameter than the main portions thereof, and screws having threaded stems with intermediate conical or tapered portions and cylindrical head portions, said screws being mounted within said bores with said threaded stems engaging the threaded portions of the bores, said intermediate conical or tapered portions protruding through the intersecting openings and engaging the periphery of the surrounded portion and said cylindrical head portions fitting the main portions of said bores, whereby upon rotation of the head portions of the screws the conical or tapered portions are moved tangentially and the front part of the chuck is adjusted transversely relative to the rear part of the chuck.

2. A self centering chuck as set forth in claim 1, wherein the cylindrical head of each screw is provided with division marks and the chuck is provided with a datum mark, whereby the degree of adjustment of the front part relative to the rear part of the chuck is indicated to provide for the proper eccentricity of the workpiece in the chuck.

References Cited in the file of this patent
UNITED STATES PATENTS

| 1,594,716 | Forkardt | Aug. 3, 1926 |

FOREIGN PATENTS

| 447,590 | France | Oct. 31, 1912 |
| 624,144 | Great Britain | May 27, 1949 |